Feb. 26, 1946.  H. J. LUTH  2,395,675
METHOD OF HARDENING CAST PHENOLIC RESIN
Filed March 3, 1941
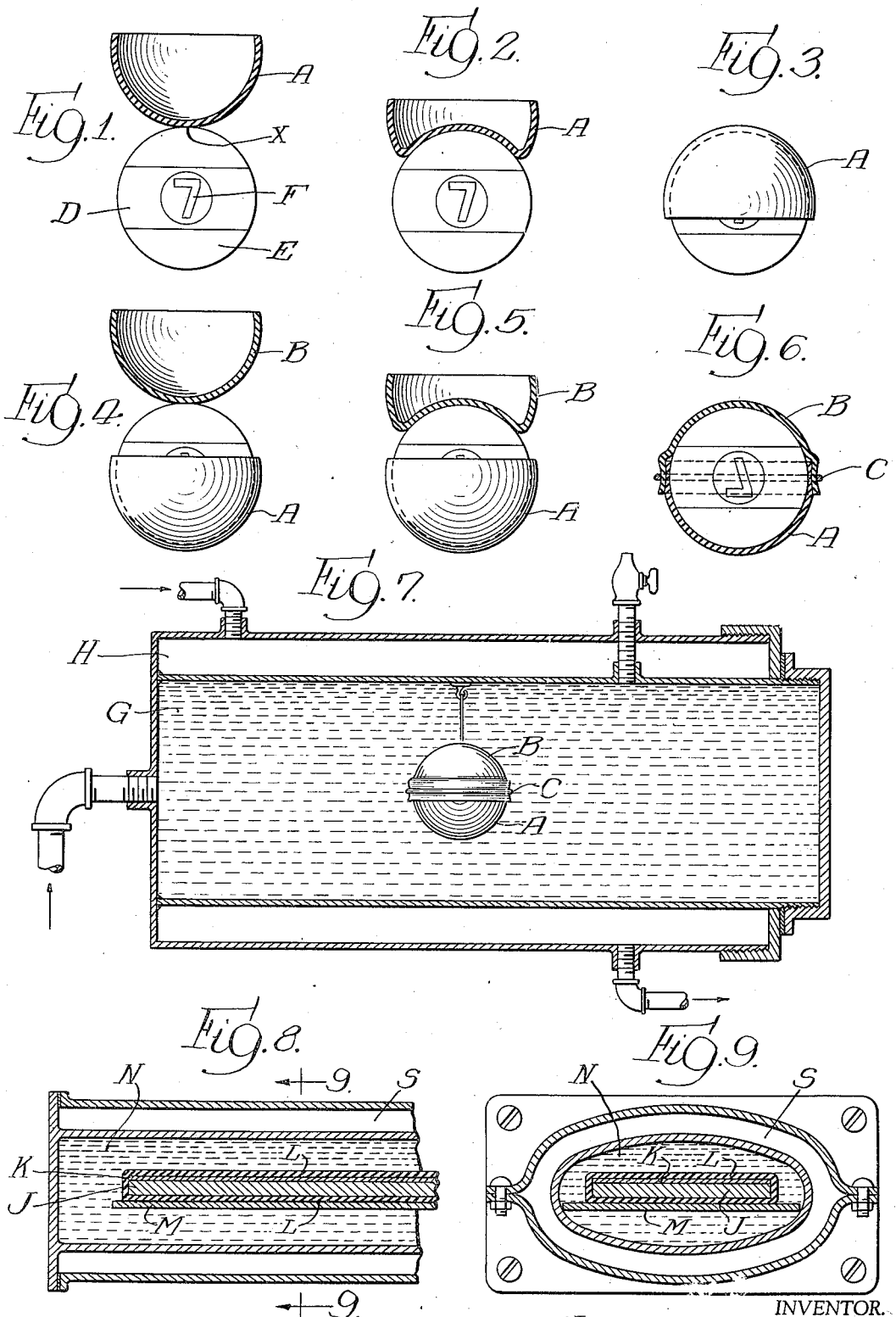
INVENTOR.
Harold J. Luth
BY
his Atty.

Patented Feb. 26, 1946

2,395,675

UNITED STATES PATENT OFFICE 2,395,675

METHOD OF HARDENING CAST PHENOLIC RESIN

Harold J. Luth, Muskegon, Mich., assignor to The Brunswick-Balke-Collender Company, Chicago, Ill., a corporation of Delaware Application March 3, 1941, Serial No. 381,506

11 Claims. (Cl. 18—48)

This invention relates to the treatment of resins which are produced from phenols and aldehydes, or phenols and aldehydes modified with other resins, or resin-forming materials, e. g., urea-aldehydes, urea, polycarboxylic acid, polyhydric alcohol resins, etc., which are known in the art as castable resins, i. e., resins which can be poured into molds or intricate forms, and subsequently allowed to set to a solid state by cooling, or by heating to bring about further reaction (polymerization) of the component materials resulting in solid masses. A cast phenolic resin is generally considered in the art as a resinous phenol formaldehyde product wherein the molecular ratio of formaldehyde to phenol is greater than 1.5 to 1, and is alkali condensed and polymerized in a weakly acid medium. It is also generally known that heating cast phenolic resins at temperatures of the order of 230° F. to 240° F. results in a swelling with a resulting lower specific gravity when the heating is done at normal atmospheric pressure. Cast phenolic billiard balls, when cured under high pressure, do not exhibit this property, the specific gravity after gunning being, if anything, slightly higher than before gunning.

More particularly the invention is directed to a process of hardening and curing billiard balls and pocket billiard balls to meet certain conditions required of such articles. In the manufacture of said balls it is very desirable that the ball be of uniform color, that it have a high degree of resiliency; for example, a ball dropped onto a heavy steel plate from a height of five feet would be expected to rebound from 75% to 90% of the height of fall. The surface should be capable of taking a high polish and have good lustre or depth of color, and the surface must be hard to resist the frictional contact of the ball and cloth, and neither mark the cloth or abrade away the surface of the ball. The surface must be sufficiently heat resistant not to become softened by the frictional heat generated when a ball slides on the table cloth.

The object of the process I have invented is to give a final product having the aforesaid properties, and which is light in color, does not undergo violent color changes in the process, is relatively stable to light, and of homogeneous structure, and which is resistant to acids, alkalis and ordinary solvents commonly used in cleaning and polishing agents. Further objects of my invention are to harden irregularly shaped articles, to give them the properties previously described, to cure and weld together a veneer of castable resin superimposed or veneered onto a backing of inexpensive composition, either in the form of shaped articles, or in the form of panels, to fuse, weld or cure together laminated objects of different colored, castable resins, and, more particularly, to fuse, weld or cure into a homogeneous unity the component parts of a pocket billiard ball, said parts being the colored bands, the vari-colored ends, the numbers and the like. An additional object is to form into a solid mass any component parts of panels, slabs, or veneers of castable resins and castable resins, or castable resins and other compositions of matter by cohesion or adhesion induced by the hardening process.

By employing my invention these properties can be obtained in a relatively short period of time. It is not unusual in ordinary heat treatment to require three or four days to harden the material, but with my process a satisfactory hardening can be obtained in six to eight hours. It is a property of cast resins to discolor in the hardening if exposed to air and/or light; my method completely eliminates the possibility of air or light coming into contact with the article during the curing process. The usual cast resins are hydrophilic in nature, and it has been assumed that the resiliency of such resins is due to such hydrophilic resins having sufficient water dispersed throughout the mass (as, for example, in a billiard ball) to give it a cellular structure conducive of resiliency, elasticity and hardness. In the usual hardening it appears that such billiard balls or other objects become dehydrated at the surface, causing the surface to become glassy and hard. In the practice of my invention, as hereinafter described, it is apparent that no such dehydration occurs, and that the object or ball retains or acquires a high resiliency, and the ball is hardened all the way through, without any dehydration. In comparative tests, a cast resin ball treated by dehydration, when dropped onto a steel plate, rebounded 83.5%; a cast resin ball of the same size and weight, hardened by my process, rebounded 83.5% of the height of fall, the height being five feet.

A cast resin ball tested for hardness on the Rockwell hardness tester, with a one-half inch indentation ball, 60 kg. load, showed on the B scale a hardness of 83 before curing, and had a hardness of 87 after treatment. With a Rockwell hardness of 83 the ball could be abraded away by drawing it sharply across a billiard cloth; after the hardness had been raised by the process of my invention to 87, the ball, when drawn sharply across a billiard cloth, did not abrade away, or mark the cloth, even though the pressure on the ball was increased until the heat of friction generated caused the ball to discolor and arrive at the point of incipient decomposition. In those processes wherein the ball or object is hardened by dehydration, an appreciable amount of discoloration on the surface occurs, and excess stock must be allowed for machining to remove the discoloration. I have found that for billiard balls such allowance must amount to as much as .080 inch on the diameter. An advantage of my invention is that, there being absolutely no access of light or air, or oxidizing medium, the discoloration is practically nil, and a beautifully lustrous surface can be obtained by removing as little as .010 inch on the diameter of a billiard ball by grinding and/or buffing. Therefore, an object can be cast very close to the finished size desired, avoiding the necessity of excessive machining or removal of material.

A billiard ball treated by my process, when immersed in dilute acids (10% hydrochloric acid, 10% sulfuric) for twenty-four hours, was unimpaired; likewise, a ball coated with a polish containing as much as 20% of ethyl alcohol and allowed to stand twenty-four hours, was unimpaired when the layer of polish was removed.

In the manufacture of articles which are put through machining processes, difficulty is encountered in obtaining a uniform appearance of the finished article when the article is clamp-squeezed or put under local pressure by the machining apparatus, it being apparent that such pressure distorts the structure of the cast resin, and in subsequent hardening and machining and polishing, those distorted areas are plainly visible. By the use of my invention this difficulty is overcome, as outlined in the second of the examples given.

Having stated the objects and advantages of my invention, I hereinafter disclose the process by means of specific, but not limiting examples in which I describe several representative applications of the process, with certain details illustrated by more or less diagrammatic drawing.

In the drawing:

Figures 1 to 6, inclusive, are elevational views partly in section, showing the several steps of the method of enclosing a ball in a jacket of rubber or the like, as described in Examples 1, 2 and 5.

Figure 7 is an axial sectional view of a steam-jacketed chamber, showing a rubber-jacketed ball suspended in the chamber for subjection to heat and hydraulic pressure.

Figure 8 is a partial longitudinal section of a chamber for subjecting a veneered panel to heat and pressure in accordance with my invention.

Figure 9 is a transverse section taken as indicated at line 99 on Figure 8.

*Example 1*

In my first example, if the article is cast very close to the final dimension, and if perfection of color is desired, the cast article is treated as follows:

The object is dipped in an inert liquid, preferably a decolorized light mineral oil in the nature of paraffin, such as is sold under the trade name of "Finol," using care to remove any air bubbles. The object (as, for example, a billiard ball) is then encased in overlapping jackets A and B of a suitable material, preferably a resilient soft rubber, and the whole placed under a vacuum to remove any air that may be entrapped. After evacuation the jackets are firmly affixed by means of a wire C to bind them about the object, as shown in Figure 6. The object is then suspended in a chamber, such as the chamber G shown in Figure 7, which is filled with water or other liquid, and the liquid is put under pressure. The chamber or vessel is heated by a steam jacket H, or other suitable means. The temperature and pressure can be varied within wide limits; the pressure on the liquid can, of course, be anything from that sufficient to keep the liquid from vaporizing up to any pressure the chamber may withstand. I prefer to use pressure from two thousand to six thousand pounds per square inch so as to continue polymerization. The temperature is limited only by decomposition of the object, as indicated by discoloration. I have found a temperature of 230° F. to 240° F. most preferable. At such temperature the article or ball can be satisfactorily hardened in five to six hours, without discoloration. After removal, the article is ready for machining, such as the final grinding or buffing applied to a billiard ball.

*Example 2*

I have found that it is not always necessary to go through the process of oil immersion and evacuation, where the object is of such a shape as will readily lend itself to air-tight jacketing, and the resilient jacket is forced onto the object with a squeegee action, forcing the air out from between the object and the jacket, as in the case of a round object such as a billiard ball. Such squeegee action is obtained by making an initial point contact of the jacket A with the ball at X, as indicated in Figure 1, and progressively increasing the area of contact, as shown on Figures 2, 3 and 4, so as to prevent any trapping of air on the surface of the ball. The second jacket B is applied in a similar manner from a point diametrically opposite the initial point of contact of the first jacket A, as shown in Figure 5, and in its final position overlaps said jacket A, as seen in Figure 6. A wire C is then tightly secured about the equator of the ball at the zone of overlapping, thus sealing the ball within the jackets. The enclosed object can then be placed in the hydraulic chamber, as in Example 1. The treatment is carried out for thirty to forty minutes, at a temperature of 270° F. to 280° F., under two thousand to six thousand pounds pressure per square inch. Then the ball is machined to size, rejacketed and treated five to six hours at 230° F. to 240° F., and two thousand to six thousand pounds pressure per square inch.

*Example 3*

On some irregularly shaped objects, or objects of such area and shape as make it impractical to make a resilient jacket to be affixed to the object, I proceed as follows:

A latex solution of proper concentration is compounded with a suitable amount of sulfur to produce a resilient jacket when cured with the necessary accelerators and activators commonly used in rubber latex compounding. Into this the object is dipped, or the solution applied by brushing, spraying or other appropriate means, until an appreciable coating is applied. This is then cured by means of heat to produce a seamless enclosure about the object. The object is then ready for heat treatment as in Examples 1 and 2, in the hydraulic chamber, after which the latex coating can be removed and the article machined and/or polished.

Example 4

A hydrophilic resin is prepared and poured over the surface of a base material, such as rubber composition of the following formula:

| | Grams |
|---|---|
| Crude rubber | 100 |
| Sulfur | 45 |
| Diphenylguanidine | .2 |
| Zinc oxide | 5 |
| Stearic acid | 10 |
| Wood flour | 200 |

The composition is cured in a mold in the form of a flanged plate or pan, not shown. The resin, when ready to cast, is poured onto the composition in the mold, forming a two-ply panel. Figure 8 shows the base composition at J, and the resin layer at K. After preliminary heating at 80° C. for seventy-two hours, the panel is coated, as described in Example 3, with latex, seen at L in Figures 8 and 9; the latex is cured in hot air or water, and the encased panel is then placed on a supporting plate M and cured under hydraulic pressure in the chamber N, with heat supplied by the steam jacket S, after which the latex is removed from the panel, and the panel may be polished, if desired.

Example 5

A pocket billiard ball cast from a hydrophilic resin having a colored band D, white field E, and colored numeral F, as seen in Figure 1, is encased in a jacket, as described in Example 2, and cured, as above, in the hydraulic chamber. After treatment the band, fields and numerals will be fused, welded, cured and joined into an inseparable mass.

It is to be understood that various modifications and changes may be made in the process described herein without departing from the scope of my invention, and that the examples herein given are by way of preferred illustration only. It is not the intention to limit the invention thereto or thereby, but rather to cover all variations and alternatives falling within the spirit and scope of the appended claims.

I claim as my invention:

1. A method of curing and hardening a cast ball of hydrophilic phenol-formaldehyde resin which includes enclosing the ball in an elastic jacket, subjecting it to a vacuum to remove entrapped gases, subjecting the jacketed ball to heat in a liquid under pressure at a temperature of 270° F. to 280° F. for thirty to forty minutes to set the resin sufficiently to prevent pressure marks, removing the jacket, machining the ball to from ten to fifteen thousandths of an inch over-size on its diameter, rejacketing the ball, subjecting it to a vacuum to remove any entrapped gases, and subjecting the jacketed ball to a temperature of 230° F. to 240° F. for a period of five to six hours while immersed in a liquid under pressure of two thousand to six thousand pounds per square inch.

2. A method of curing and hardening, fusing and welding into a solid homogeneous mass a pocket billiard ball built up of plastic material of contrasting colors to provide a surface design thereon and consisting of integral units of hydrophilic castable phenol-formaldehyde resin, the method comprising enclosing the ball in a liquid-tight, flexible jacket, subjecting it to a vacuum to remove any entrapped gases, and subjecting the enclosed ball to heat in a liquid under pressure at a temperature of 270° F. to 280° F. for thirty to forty minutes, removing the jacket, machining the ball to a diameter very slightly over-size, then rejacketing the ball, again subjecting it to a vacuum to remove entrapped gases, and subjecting the enclosed ball to heat in a liquid under pressure at a temperature of 230° F. to 240° F. for a period of five to six hours to harden the ball substantially all the way through.

3. A method of curing and hardening an object of cast phenol-formaldehyde resin which includes enveloping the object with compounded latex in liquid form, vulcanizing the latex thereon by the application of heat to produce a seamless jacket enclosing the object, and subjecting the jacketed object to heat in a liquid under pressure.

4. A method of curing and hardening a casting of hydrophilic phenol-formaldehyde resin which includes enveloping the casting with a compounded latex in liquid form, vulcanizing the latex thereon by the application of heat to form a seamless jacket enclosing the casting and excluding air, light and any other oxidizing medium from the surface thereof, subjecting the jacketed casting to heat in a liquid under pressure at a temperature of 270° F. to 280° F. for thirty to forty minutes, removing the jacket, machining the casting to within ten to fifteen thousandths of its final dimensions, then recoating the casting with compounded liquid latex, vulcanizing the coating and subjecting the casting to heat while immersed in a liquid under pressure for several hours.

5. The method of hardening a body of solidified cast hydrophilic phenol-formaldehyde resin material in the form of a billiard ball without appreciable deformation of said ball which comprises coating said billiard ball with an inert liquid medium, enclosing said coated billiard ball in two overlapping soft rubber jackets, evacuating said jackets to prevent entrapment of air therein, sealing said jackets by securing together their overlapping portions, subjecting said sealed ball to a fluid pressure from about 2000 to about 6000 pounds per square inch applied to the exterior of the jacket and simultaneously maintaining the temperature of said ball substantially above 80° C. but below the decomposition temperature of said phenol-formaldehyde resin material.

6. The method of hardening a body of solidified cast hydrophilic phenol-formaldehyde resin material in the form of a billiard ball without appreciable deformation of said ball which comprises sealing said ball in an elastic liquid-tight jacket, subjecting said sealed ball to a pressure from about 2000 to about 6000 pounds per square inch applied through a body of liquid in which said ball is immersed, simultaneously maintaining the temperature of said ball between about 230° F. and the decomposition temperature of said phenol-formaldehyde resin material for a period of time sufficient to set the resin material to a degree such that it does not become pressure marked during machining, removing said jacket, machining said ball to remove from its outer surface a layer from about .010 inch to about .015 inch thick, and then resealing the ball in a jacket as aforesaid and again subjecting the sealed ball to a pressure in the aforesaid range while maintaining the temperature of the ball within the aforesaid temperature range until the desired hardness is obtained.

7. The method of hardening a body of solidified cast hydrophilic phenol-formaldehyde resin material without appreciable deformation of the body which comprises forming a coating of rubber material enclosing said body from a compounded latex, vulcanizing the layer of rubber material to form a seamless jacket enclosing said body, subjecting the enclosed body to a pressure from about 2000 to about 6000 pounds per square inch applied through a liquid in which the jacketed body is immersed and simultaneously maintaining the temperature of said body substantially above 80° C. but below the decomposition temperature of said body.

8. The method of hardening a body of solidified cast hydrophilic phenol-formaldehyde resin material in the form of a billiard ball without appreciable deformation of said ball which comprises sealing the ball in an elastic jacket under conditions such that no gas is entrapped within said jacket, subjecting said jacketed ball to superatmospheric pressure applied through a liquid in which said jacketed ball is immersed and simultaneously maintaining the temperature of said ball at from about 270° F. to about 280° F. for from about 30 to about 40 minutes to set the resin material to a degree such that it does not become pressure marked during machining, removing said jacket, machining said ball to remove from its outer surface a layer from about .010 inch to about .015 inch thick, then resealing the ball in a jacket as aforesaid and subjecting the jacketed ball to a pressure from about 2000 to about 6000 pounds per square inch applied through a liquid in which the said jacketed ball is immersed and simultaneously maintaining the temperature of said ball between about 230° F. and about 240° F. for a period from about 5 to about 6 hours.

9. A method of hardening into a pocket billiard ball a solidified spherical mass built up by casting together a plurality of bodies of hydrophilic phenol-formaldehyde resin material of contrasting colors providing a surface design on said ball without appreciably deforming said mass during said hardening which comprises sealing said mass in a liquid-tight flexible jacket after evacuating said jacket to prevent entrapment of gas therein, subjecting the jacketed mass to superatmospheric pressure applied through a liquid in which said jacketed body is immersed and simultaneously maintaining the temperature of said mass between about 270° F. and about 280° F. for from about 30 to about 40 minutes, removing the jacket, machining the mass to a sphere having a diameter very slightly larger than the desired diameter of the ball, then resealing the ball in a jacket as aforesaid after evacuating the jacket to prevent entrapment of gas, subjecting the jacketed mass to superatmospheric pressure applied through a liquid in which said jacketed mass is immersed while simultaneously maintaining the temperature of said mass between about 230° F. and about 240° F. for from about 5 to about 6 hours to form a pocket billiard ball hardened substantially all the way through.

10. The method of hardening a body of solidified cast hydrophilic phenol-formaldehyde resin material without appreciable deformation of the body which comprises forming a coating of rubber material enclosing said body from a compounded latex, vulcanizing the layer of rubber material to form a seamless jacket enclosing said body, subjecting the enclosed body to superatmospheric pressure applied through a liquid in which said enclosed body is immersed and simultaneously maintaining the temperature of said body substantially above 80° C. but below the decomposition temperature of said body.

11. The method of hardening a body of solidified cast hydrophilic phenol-formaldehyde resin material without appreciable deformation of the body which comprises forming a coating of rubber material enclosing said body from a compounded latex, vulcanizing the layer of rubber material to form a seamless jacket enclosing said body and excluding air, light and other oxidizing media from the surface of said body, subjecting the enclosed body to superatmospheric pressure applied through a liquid in which said enclosed body is immersed and simultaneously maintaining the temperature of said body between about 270° F. and about 280° F. for from about 30 to about 40 minutes, removing the jacket, machining the body to dimensions within from about .010 inch to about .015 inch of its desired final dimensions, then again enclosing the body with a coating of rubber material formed from a compounded latex, vulcanizing the coating to again form a seamless jacket enclosing the body and again subjecting the body to superatmospheric pressure applied through a liquid in which the enclosed body is immersed and simultaneously maintaining the temperature of said body substantially above 80° C. but below the decomposition temperature of said body for a period of several hours.

HAROLD J. LUTH.